No. 611,691. Patented Oct. 4, 1898.
D. A. LANGDON & C. H. BROWN.
SYSTEM OF FILTRATION.
(Application filed Dec. 26, 1895.)

(No Model.) 2 Sheets—Sheet 1.

WITNESSES.
Matthew M. Blunt.
J. Murphy.

INVENTORS.
Daniel A. Langdon
Clarence H. Brown
By Jas. H. Churchill
ATT'Y.

No. 611,691. Patented Oct. 4, 1898.
D. A. LANGDON & C. H. BROWN.
SYSTEM OF FILTRATION.
(Application filed Dec. 26, 1895.)

(No Model.) 2 Sheets—Sheet 2.

WITNESSES.
Matthew M. Blunt.
J. Murphy

INVENTORS
Daniel A. Langdon
Clarence H. Brown
by Jno. H. Churchill
ATT'Y.

UNITED STATES PATENT OFFICE.

DANIEL A. LANGDON, OF CHELSEA, AND CLARENCE H. BROWN, OF EVERETT, MASSACHUSETTS.

SYSTEM OF FILTRATION.

SPECIFICATION forming part of Letters Patent No. 611,691, dated October 4, 1898.

Application filed December 26, 1895. Serial No. 573,288. (No model.)

*To all whom it may concern:*

Be it known that we, DANIEL A. LANGDON, residing at Chelsea, in the county of Suffolk, and CLARENCE H. BROWN, residing at Everett, in the county of Middlesex, State of Massachusetts, have invented an Improvement in Systems of Filtration, of which the following description, in connection with the accompanying drawings, is a specification, like letters on the drawings representing like parts.

This invention relates to a portable system for the filtration of water and other liquids, and is more especially designed for use in houses, stores, and like places.

This invention has for its object to provide a simple, efficient, and germ-proof system of filtration whereby an increased amount or quantity of the filtered liquid may be obtained in a given time, which liquid is absolutely free from germs.

In accordance with this invention a primary filtering apparatus consisting of a water-containing vessel in which are suspended porcelain or other filtering-tubes is connected to a secondary filtering apparatus containing charcoal or other solid clarifying medium, and to the outlet-pipe for the filtered water from the primary filtering apparatus is connected an air chamber or reservoir which is in communication with the primary filtering apparatus for a purpose as will be described. The secondary filtering apparatus, containing the charcoal or other solid clarifying medium, in accordance with this invention, is made of a construction, as will be described, whereby the said apparatus is prevented from becoming air-locked, thereby increasing the efficiency of the secondary apparatus, as will be described.

Another feature of this invention consists in the novel construction of the primary filtering apparatus, whereby the support which holds the porcelain tube is rendered liquid-tight, so as to prevent the said support from working loose from its tube, and thereby preventing the passage of unfiltered water between the tube and its support, as will be hereinafter described.

These and other features of this invention will be pointed out in the claims at the end of this specification.

Figure 1:
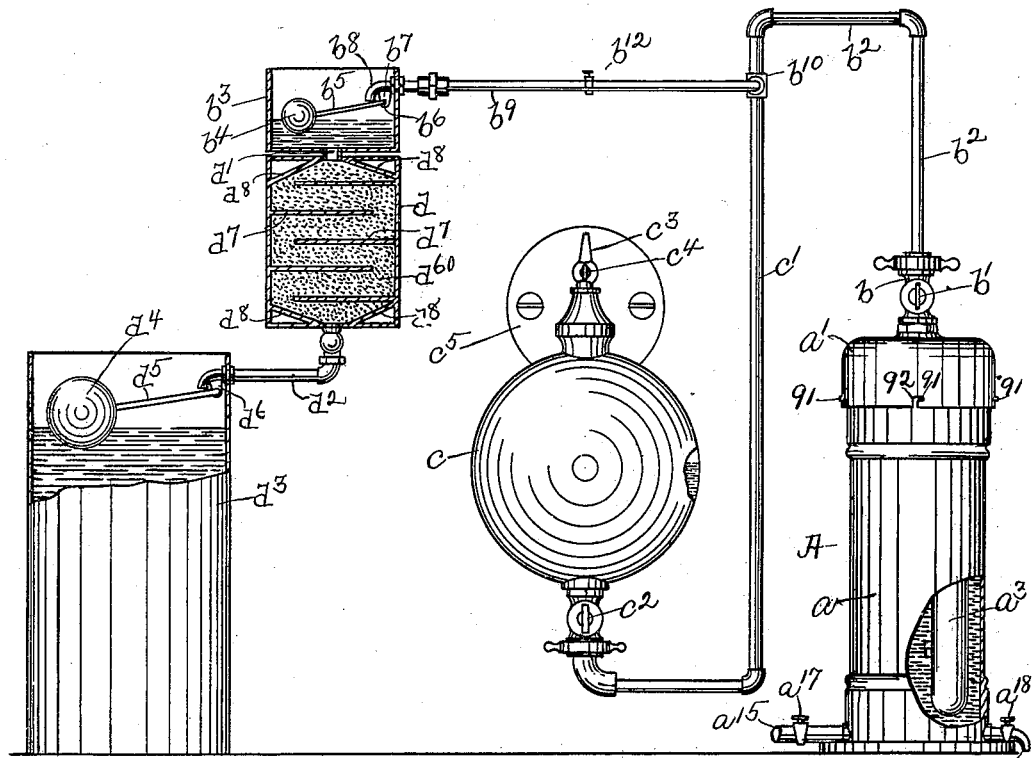
Figure 4:
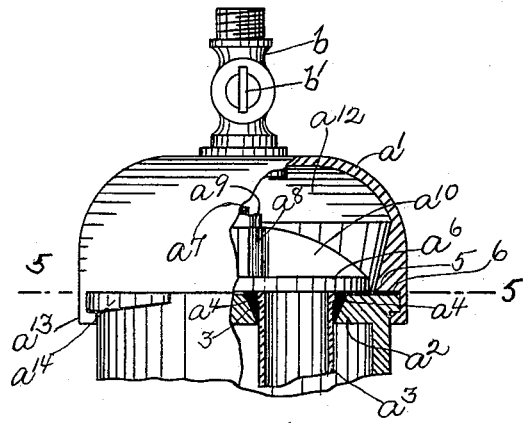
Figure 2:
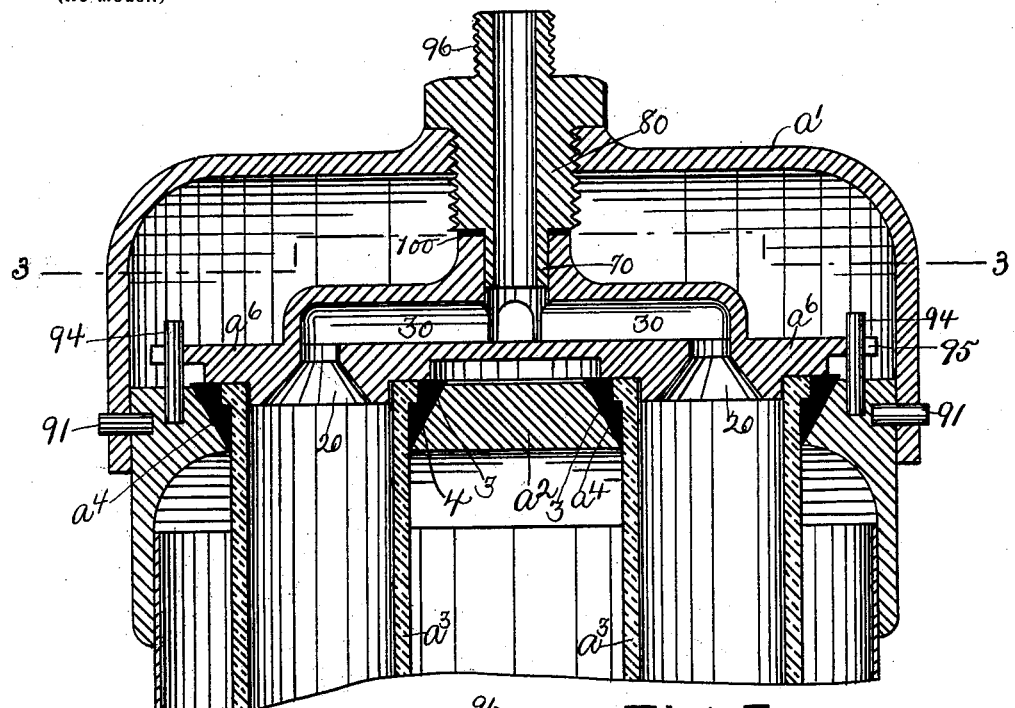
Figure 3:
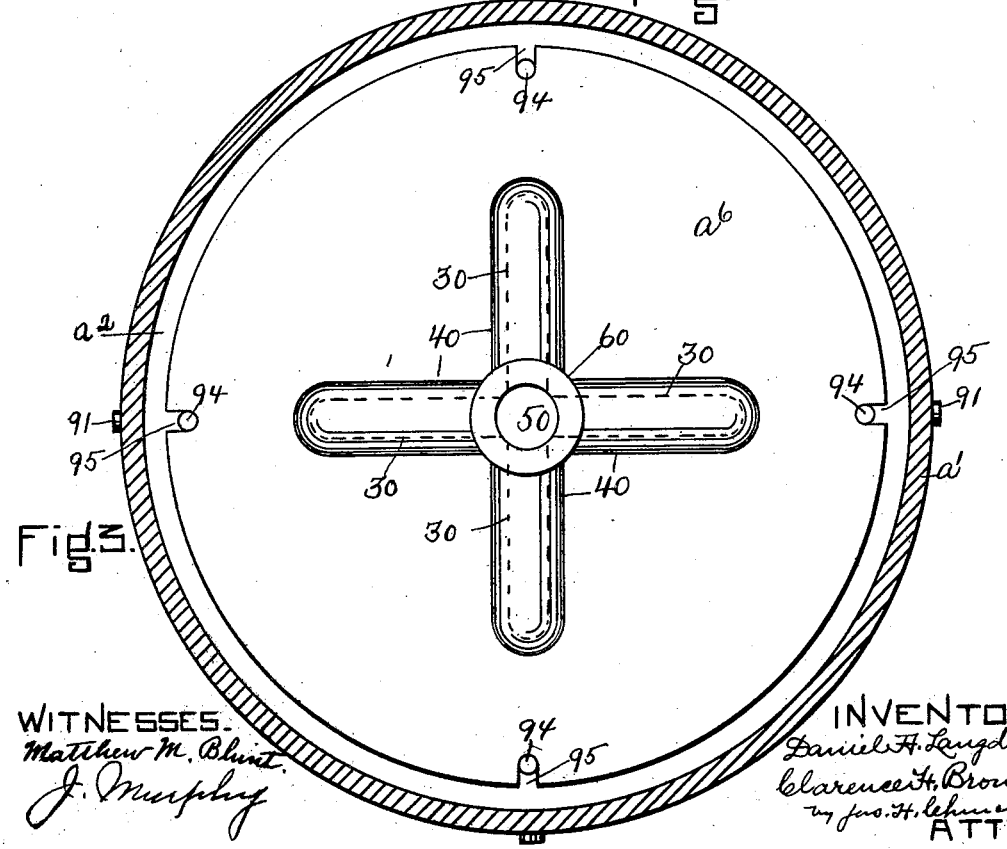

Figure 1 represents in elevation, with parts broken out, a portable filtering system embodying this invention; Fig. 2, an elevation, with parts broken out and on an enlarged scale, of the upper portion of the primary filtering apparatus shown in Fig. 1; Fig. 3, a sectional detail on the line 3 3, Fig. 2, looking down; Fig. 4, an elevation, with parts broken out, of a modified form of primary filtering apparatus; and Fig. 5, a sectional detail on line 5 5, Fig. 4, to be referred to.

Referring to Fig. 1, A represents the primary filtering apparatus, which in accordance with this invention is preferably made as will now be described. The primary filtering apparatus A consists, essentially, of a tank or vessel $a$, closed at its bottom and provided with a removable cover or cap $a'$, by which access may be had to the interior of the tank $a$. The tank $a$ is preferably made of metal and is provided with a top plate $a^2$, (see Fig. 2,) having one or more openings made in it for the reception of the filtering-tubes $a^3$, which latter may be made of porcelain or other suitable non-metallic porous material.

In the present instance the top plate $a^2$ of the tank $a$ is represented as provided with four tube-receiving openings, but we do not desire to limit our invention to any particular number, as the number of openings in the top plate $a^2$ will depend upon the capacity of the primary filtering apparatus. In accordance with this invention each filtering-tube $a^3$ is separated from the top plate $a^2$ by a gasket or ring $a^4$, of rubber or other compressible material, which is provided with a downwardly-beveled outer side marked 3 in Fig. 2, the said beveled outer surface of the gasket conforming to the beveled wall or seat 4 of the tube-receiving opening. The internal diameter of the gasket $a^4$ is made substantially the same as the external diameter of the filtering-tube $a^3$ and normally hugs or fits the same closely, and the gasket $a^4$ will preferably be made of suitable length, so as to normally project above the upper surface of the top plate $a^2$, whereby the said gasket may be forced downward onto its beveled seat 4 by a compressor preferably made as shown in Figs. 2 and 3 and consisting of a plate or disk $a^6$, having suitable openings 20, which register with the filtering-tubes $a^3$, and which, as shown in Figs. 2 and 3, are connected by passages 30, formed in raised ribs or arms 40, to a substantially central outlet-opening 50, formed in a substantially central hub 60, into which extends the reduced end 70 of a threaded sleeve or nut 80, which is inserted through a threaded opening in the cover $a'$, the said sleeve or nut being adapted to engage the upper surface of the hub 60 and separated therefrom, as herein shown, by a packing-ring 100.

The plate or disk $a^6$ is adapted to rest upon the rubber or other gaskets $a^4$ and is adapted to be forced down upon the same to force their beveled or tapering outer surfaces into close contact with the beveled or tapering seats 4 of the tube-receiving openings in the top plate $a^2$ by turning the nut or sleeve 80 in the threaded opening in the cover $a'$, which latter is secured against upward movement by pins or projections 91, on the outside of the tank A, entering suitable bayonet-slots 92 in the depending flange of the cover. The compressor plate or disk $a^6$ is guided in its movement, as herein shown, and is maintained in its desired position with relation to the openings 20, registering with the tubes $a^3$, by means of guide-pins or studs 94, erected from the top plate $a^2$ and entering slots 95 in the said plate.

The tank or vessel $a$ is provided at its lower end, as herein shown, with an inlet-pipe $a^{15}$ for the unfiltered water and with an outlet-pipe $a^{16}$ for sediment, said pipes being provided, respectively, with valves $a^{17}$ $a^{18}$. The threaded sleeve or nut 80 is provided with a threaded nipple 96, to which is connected one end of a coupling $b$, provided with a cock or valve $b'$, by which the outflow of filtered water from the tank A may be controlled, the said coupling having connected to it the outlet-pipe $b^2$ for the filtered water, which outlet-pipe, as herein shown, (see Fig. 1,) leads to a tank or reservoir $b^3$, provided with an automatic shut-off, which may be of any usual or suitable construction and herein represented as a float $b^4$, having its stem or rod $b^5$ pivoted, as at $b^6$, to lugs or ears $b^7$, depending from the discharge faucet or end $b^8$ of the inlet-pipe $b^9$ for the tank $b^3$.

The inlet-pipe $b^9$ is connected by a T or other suitable coupling $b^{10}$ to the outlet-pipe $b^2$ for the primary filtering apparatus and practically forms a continuation of the outlet-pipe $b^2$. The pipe $b^9$ may and preferably will be provided with a cock or valve $b^{12}$.

In the normal condition of the apparatus the unfiltered water flows from the street-main or other suitable source of supply under pressure through the pipe $a^{15}$, the valve $a^{17}$ being open, into the tank or vessel $a$, and passes through the pores of the filtering-tubes $a^3$, filling the said tubes and gradually filling the passages 30 in the compressor-plate $a^6$. The water admitted into the tank $a$ is freed from germs and foreign matter by this passage through the filtering-tubes, and the filtered water passes out through the sleeve 80, coupling $b$, the valve $b'$ being open, the pipe $b^2$, and through the inlet-pipe $b^9$ into the tank $b^3$.

After the filter has been used some little time the pores of the filtering-tubes $a^3$ become clogged and have to be removed or cleaned. This invention has for one of its objects to prolong the operativeness of the filtering-tubes, and this result is accomplished, as proven by practical demonstration, by interposing between the outlet or discharge-mouth of the pipe $b^9$ and the tank $a$ an air reservoir or chamber $c$, which is connected by a suitable pipe $c'$ in the present instance to the fitting $b^{10}$, and is thereby in direct communication with the interior of the tubes $a^3$ in the primary filtering apparatus, and is in communication with the tank $b^3$ when the valve on the stem $b^5$ is open. The air reservoir or chamber $c$ may and preferably will have its water and air inlet pipe $c'$ provided with a cock or valve $c^2$, and the said air-chamber may and preferably will be provided with a discharge or outlet pipe $c^3$, which is likewise provided with a suitable cock or valve $c^4$. The reservoir $c$ may have secured to or forming part of it a plate $c^5$, by which the said reservoir may be attached to a suitable support, such as the wall of a building.

To economize space, the air-reservoir $c$ is located substantially on the same level as the primary filtering apparatus A. When the primary filtering apparatus A is in operation, the cock or valve $c^4$ is closed and the valve $c^2$ is opened, so that the filtered water passing out through the outlet-pipe $b^2$ may flow down into the reservoir $c$, thereby placing the air contained therein under pressure, which pressure accumulates when the ball-cock valve in the tank $b^3$ is closed, and which pressure diminishes when the ball-cock valve is opened.

By means of the beveled or tapering gasket which supports the filtering-tube danger of the said gasket swelling under the influence of the water in the tank $a$ is practically entirely avoided, as the said gasket may be kept pressed down onto its seat with sufficient pressure to insure the said gasket hugging the tube so as to form a perfectly liquid-tight joint, and as a result unfiltered water is prevented from passing between the gasket and the tube into the said tube, and absolutely germ-proof water is furnished by the filter.

The filtered water admitted into the tank or vessel $b^3$ passes, as herein shown, into a second chamber $d$, provided with a substantially central water-inlet pipe $d'$, communicating with the vessel $b^3$, the said chamber having in its bottom a substantially central outlet, with which communicates a pipe $d^2$, leading, as shown, to a storage tank $d^3$, the pipe $d^2$ being automatically closed and opened by a float $d^4$ on a lever $d^5$, pivoted to lugs $d^6$ and carrying a valve which is adapted to close the pipe $d^2$ when the filtered water reaches a predetermined level in the storage-tank $d^3$. The chamber $d$ is filled with carbon or other solid clarifying material $d^{60}$, and the said chamber is preferably provided with a series of shelves or partitions $d^7$, alternately extended from the opposite walls of the said chamber to form a continuous serpentine passage for the water through the carbon $d^{60}$. The chamber $d$, as thus far described, has been made and used, but it is deficient after some use by reason of the air contained in the water accumulating in the corners and forming an air-lock, by which the flow of liquid through the chamber $d$ is prevented or greatly retarded.

This invention has for one of its objects to obviate the defect in the chamber $d$ referred to, and this object is accomplished by providing the chamber at its top and preferably at its bottom with inclined plates $d^8$, extending from the walls of the chamber toward the center water inlet and outlet, whereby the air which naturally would collect in the corners is deflected toward the inlet and outlet orifices of the chamber. As a result of this construction the filtering-chamber $d$ may be used a much longer time than as now commonly constructed and stoppage of the flow of filtered liquid is avoided.

Figure 5:
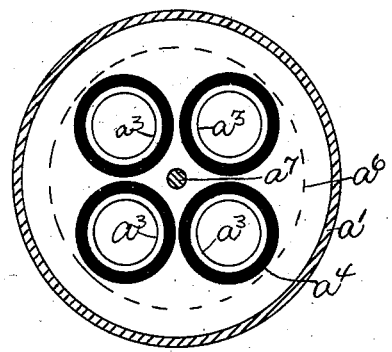

We prefer to employ the construction of primary filtering-tank shown in Figs. 1, 2, and 3 and above described, but we do not desire to limit our invention to the particular form of compressor-plate therein shown, as the said compressor-plate may be made in other forms, such, for instance, as shown in Figs. 4 and 5.

Referring to Fig. 4, the compressor-plate $a^6$ is represented as provided with wings or ribs $a^{10}$, extended from a central boss or hub $a^8$, having a suitable opening through which extends a bolt $a^7$, the said bolt being also extended up through the plate $a^6$, and is provided above the hub $a^8$ with a nut $a^9$, by turning which the compressor-plate may be forced down upon the beveled gaskets $a^4$.

In the construction shown in Fig. 4 the cover $a'$ is disconnected from the compressor-plate $a^6$ and is secured liquid-tight to the tank or vessel A by means of depending fingers or locking projections $a^{13}$, which are adapted to engage cam-shaped or inclined flanges $a^{14}$ on the outer surface of the tank $a$, the cover $a'$ being preferably thickened on its inner side to form an annular flange or shoulder 5, between which and the top plate $a^2$ is interposed an annular ring 6, of rubber or other suitable packing material.

In the construction shown in Fig. 4 the cover $a'$ forms with the top plate $a^2$ a chamber $a^{12}$ for the filtered water, and therefore the cover is tightly packed, whereas in the construction shown in Figs. 1 and 2 the cover does not form a chamber for the filtered water, and therefore does not require to be tightly packed.

We claim—

1. In a portable system for filtration, the combination with a tank or vessel provided with a top plate having a tube-receiving tapered or beveled opening, and a gasket encircling the said tube and beveled or tapered on its outer surface to fit the said beveled or tapered opening, a removable cover or cap for said vessel, an adjustable compressor to act on the beveled gasket and separate from said cap or cover, and means to adjust the said compressor, substantially as described.

2. In a portable system of filtration, the combination with a tank or vessel provided with a top plate having downwardly-beveled openings, filtering-tubes suspended from said top plate through said openings, and gaskets encircling said tubes and provided with a beveled outer surface to fit the beveled tube-receiving openings, a compressor-plate provided on its under surface with openings registering with the mouths of the said filtering-tubes, and having a substantially central outlet-opening connected with the openings in its under surface, a cover for said tank or vessel, and an adjustable sleeve extended through said cover and communicating with the substantially central outlet-opening of the compressor-plate, substantially as described.

3. In a portable system of filtration, the combination with a tank or vessel provided with a top plate having beveled tube-receiving openings, filtering-tubes suspended from said top plate and provided with compressible gaskets encircling the said tubes at their upper ends and beveled or tapered on their outer surface to fit the beveled openings in the top plate of the said tank, a compressor located above the said top plate and adapted to engage the said gaskets and force the same down onto their beveled seats, and a detachable cover for said tank or vessel independent of said compressor, substantially as described.

4. In a portable system of filtration, the combination with a tank or vessel provided with a top plate having tube-receiving openings, filtering-tubes inserted through said openings, gaskets encircling said tubes and seated in said openings, a compressor to act on said gaskets, guides for the said compressor, a cover locked to the tank and separate from said compressor, and means extended through the said cover to act on the compressor and force it down on the gaskets, substantially as described.

5. In a portable system of filtration, the combination with a tank or vessel provided with a top plate having tube-receiving openings, filtering-tubes inserted through said openings, gaskets encircling said tubes and seated in said openings, a compressor-plate provided with the hollow arms 40 communicating with the filtering-tubes and with a substantially central outlet in the compressor-plate, guides for the said compressor-plate, a cover locked to the tank, and a threaded sleeve inserted through a threaded opening in the cover and engaging the compressor-plate, the said sleeve forming a continuation of the outlet through the plate for the filtered water, substantially as described.

In testimony whereof we have signed our names to this specification in the presence of two subscribing witnesses.

DANIEL A. LANGDON.
CLARENCE H. BROWN.

Witnesses:
JAS. H. CHURCHILL,
J. MURPHY.